United States Patent
Gaboardi et al.

(10) Patent No.: US 9,440,320 B2
(45) Date of Patent: Sep. 13, 2016

(54) SUPPORT AND GRIPPING DEVICE OF A MECHANICAL PART, SUITABLE FOR A MACHINE TOOL

(71) Applicant: GNUTTI TRANSFER S.p.A., Brescia (IT)

(72) Inventors: Giordano Gaboardi, Brescia (IT); Stefano Coraglia, Brescia (IT)

(73) Assignee: GNUTTI TRANSFER S.p.A., Brescia (IT)

( * ) Notice: Subject to any disclaimer, the term of this patent is extended or adjusted under 35 U.S.C. 154(b) by 272 days.

(21) Appl. No.: 14/347,000

(22) PCT Filed: Sep. 27, 2012

(86) PCT No.: PCT/IB2012/055155
§ 371 (c)(1),
(2) Date: Mar. 25, 2014

(87) PCT Pub. No.: WO2013/046147
PCT Pub. Date: Apr. 4, 2013

(65) Prior Publication Data
US 2014/0230231 A1    Aug. 21, 2014

(30) Foreign Application Priority Data
Sep. 28, 2011   (IT) ............................... BS2011A0131

(51) Int. Cl.
| | | |
|---|---|---|
| *B23B 31/20* | (2006.01) | |
| *B23Q 3/06* | (2006.01) | |
| *B23Q 16/10* | (2006.01) | |

(52) U.S. Cl.
CPC .............. *B23Q 3/067* (2013.01); *B23B 31/201* (2013.01); *B23B 31/207* (2013.01); *B23Q 16/10* (2013.01);
(Continued)

(58) Field of Classification Search
CPC .............. B23B 31/201; B23B 31/207; B23B 2231/2078; B23B 2240/04; B23Q 3/067; B23Q 16/10; Y10T 279/17307; Y10T 279/17376; Y10T 279/17471; Y10T 279/17521
See application file for complete search history.

(56) References Cited

U.S. PATENT DOCUMENTS

| | | | | |
|---|---|---|---|---|
| 1,263,270 A | * | 4/1918 | Millholland | .......... B23B 13/125 279/46.8 |
| 2,219,008 A | * | 10/1940 | Driasner | ............... B23B 31/202 279/46.6 |

(Continued)

FOREIGN PATENT DOCUMENTS

| | | |
|---|---|---|
| CH | 559602 A5 | 3/1975 |
| CH | 574292 A5 | 4/1976 |

(Continued)

OTHER PUBLICATIONS

Brochure for MIKRON Multistar CX-24/1500R, "Description of the System" Version 01, Jul. 6, 2010.
(Continued)

*Primary Examiner* — Eric A Gates
(74) *Attorney, Agent, or Firm* — Meunier Carlin & Curfman LLC

(57) ABSTRACT

A machine tool (2) comprising a mobile table (11) and a support and gripping device (200) fitted to one said machine tool (2) and which comprises:—pincer means (210) for blocking the part;—a support (250) which contains and supports the pincer means (210) and is blocked to the mobile table (11). The pincer means (210) comprise a part blocking pincer (212) and an intermediate pincer (211), respectively one inside the other, both elastic. The part blocking pincer (212) has a structure for gripping the part following interaction between the intermediate pincer (211) and the support. (250); in addition the pincer means (210) are suitable for being placed in rotation around the pincer axis (P-P).

10 Claims, 8 Drawing Sheets

(52) U.S. Cl.
CPC .... *B23B 2231/2078* (2013.01); *B23B 2240/04* (2013.01); *Y10T 29/49998* (2015.01); *Y10T 279/17307* (2015.01); *Y10T 279/17376* (2015.01); *Y10T 279/17471* (2015.01); *Y10T 279/17521* (2015.01)

(56) References Cited

U.S. PATENT DOCUMENTS

| | | | | |
|---|---|---|---|---|
| 2,299,972 | A * | 10/1942 | Gallen | B23B 13/125 279/29 |
| 2,351,220 | A * | 6/1944 | Martin | B23B 13/125 279/20.1 |
| 2,382,060 | A * | 8/1945 | Ingalls | B23B 31/202 279/51 |
| 2,644,929 | A * | 7/1953 | Kumpf | H02G 15/085 174/75 C |
| 3,542,385 | A * | 11/1970 | Seitter | B23B 31/201 279/46.8 |
| 3,583,714 | A * | 6/1971 | Weltzer | B23B 31/202 279/136 |
| 4,690,415 | A * | 9/1987 | Holdridge | B23B 31/205 279/4.09 |
| 4,762,447 | A * | 8/1988 | Marantette | B23B 31/205 279/4.04 |
| 4,867,463 | A * | 9/1989 | Hopf | B23B 1/202 279/46.7 |
| 5,133,565 | A * | 7/1992 | Schmidt | B23B 1/4066 279/2.04 |
| 6,640,679 | B1 * | 11/2003 | Roberts, Jr. | B23B 31/207 279/143 |
| 7,422,219 | B2 * | 9/2008 | Kress | B23B 31/1077 279/2.02 |
| 2015/0021864 | A1 * | 1/2015 | Mauch | B23B 31/201 279/43.1 |

FOREIGN PATENT DOCUMENTS

| | | |
|---|---|---|
| DE | 1245147 B | 7/1967 |
| GB | 560561 A | 4/1944 |

OTHER PUBLICATIONS

International Search Report and Written Opinion of the International Searching Authority, received in corresponding application PCT/IB2012/055155, mailed Oct. 12, 2012.

* cited by examiner

SUPPORT AND GRIPPING DEVICE OF A MECHANICAL PART, SUITABLE FOR A MACHINE TOOL

The present invention relates to a machine tool for mechanical operations comprising a support and gripping device of mechanical parts and to the support and gripping device of mechanical parts itself.

In particular, said support and gripping device is suitable for blocking and supporting one or more mechanical parts so that the various operational groups of the machine tool are able to perform their operations.

Devices suitable for these purposes, such as hydraulic or pneumatic pincers are known of in the art.

Said mechanical parts having to undergo mechanical operations, such as machining to remove shavings, as opposed to assembly operations, the mechanical parts need to be blocked and supported as firmly as possible. In other words it is extremely important for the mechanical parts to be blocked so as to avoid changes in position such as misalignment or the like, either during machining operations or during any movement thereof.

To such purpose the blocking devices typical of the prior art have blocking portions suitable for gripping significant portions of the mechanical parts, causing a series of drawbacks.

Extensive blocking portions cause significant swarf to be produced; secondly, the more extensive said blocking portions are the more complicated and therefore the longer the blocking and release operations of said devices are; in addition the more space occupied by said support and gripping devices the more difficult the machining of the mechanical part is.

In addition, the blocked mechanical parts usually need to be placed in rotation for example around an axis, in such a way as to permit machining for the removal of shavings and the like.

The drawbacks mentioned above are therefore even more serious when the mechanical parts need to be placed in rotation.

The purpose of the present invention is to overcome the drawbacks typical of the prior art and satisfy such requirements, by providing a support and gripping device and a machine tool which comprises said device, suitable for blocking and moving one or more mechanical means occupying a minimum part thereof leaving thereby extensive accessibility; all while also permitting the rotation of said means suitable for performing such blocking of the mechanical part.

Said purpose is achieved by a support and gripping device and a machine tool which comprises said device, such as those described below and claimed in claim 1 and in claim 22. Further advantageous characteristics are protected in the dependent claims.

The characteristics and advantages of the invention will be evident from the description given below, made by way of a non-limiting example and with reference to the appended drawings showing possible embodiments of the device which the invention relates to:

Figure 1:
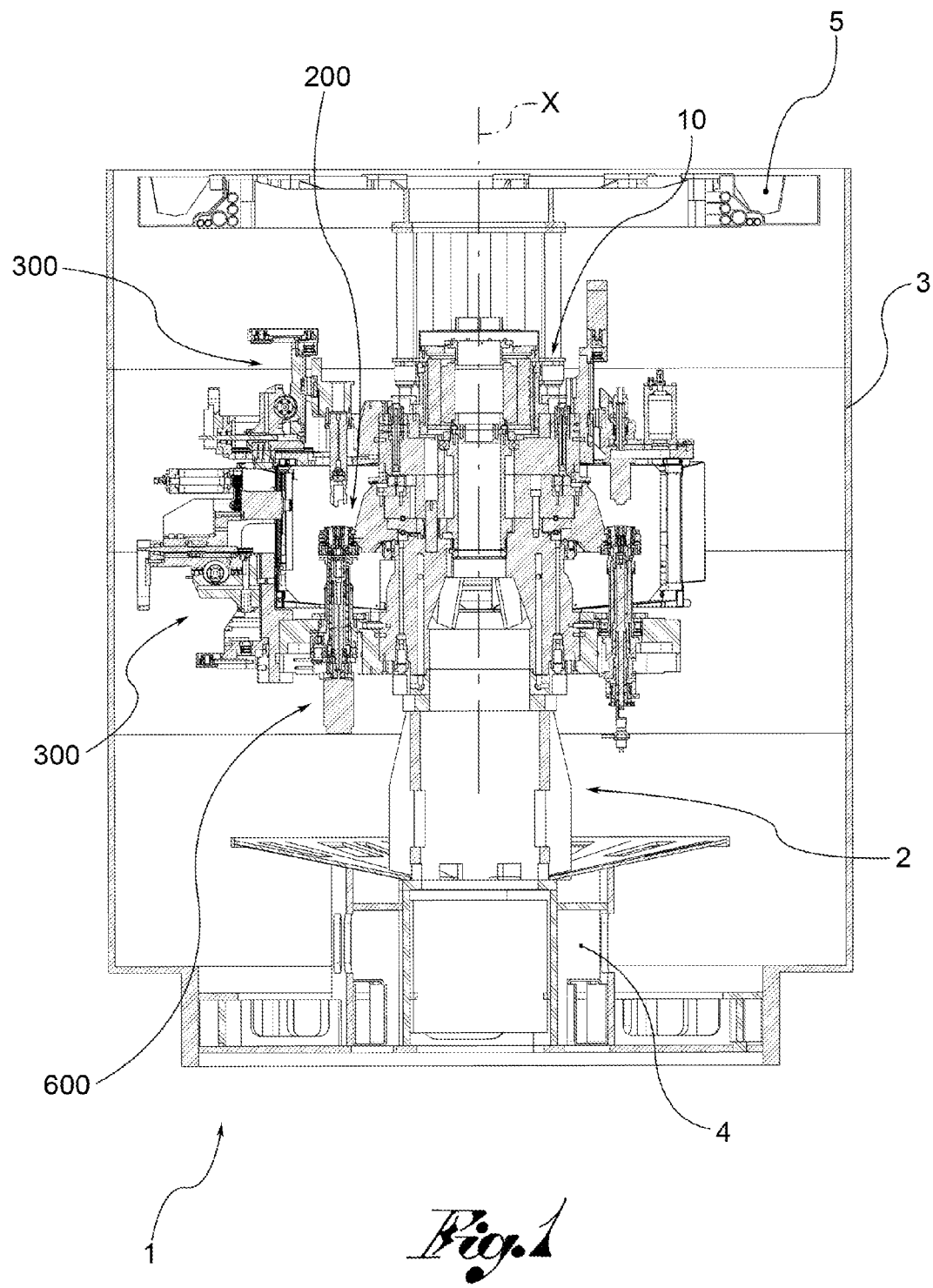
FIG. 1 is a front view in transversal cross-section of an apparatus for mechanical operations, comprising the machine tool comprising in turn a support and gripping device according to the invention.
Figure 2:
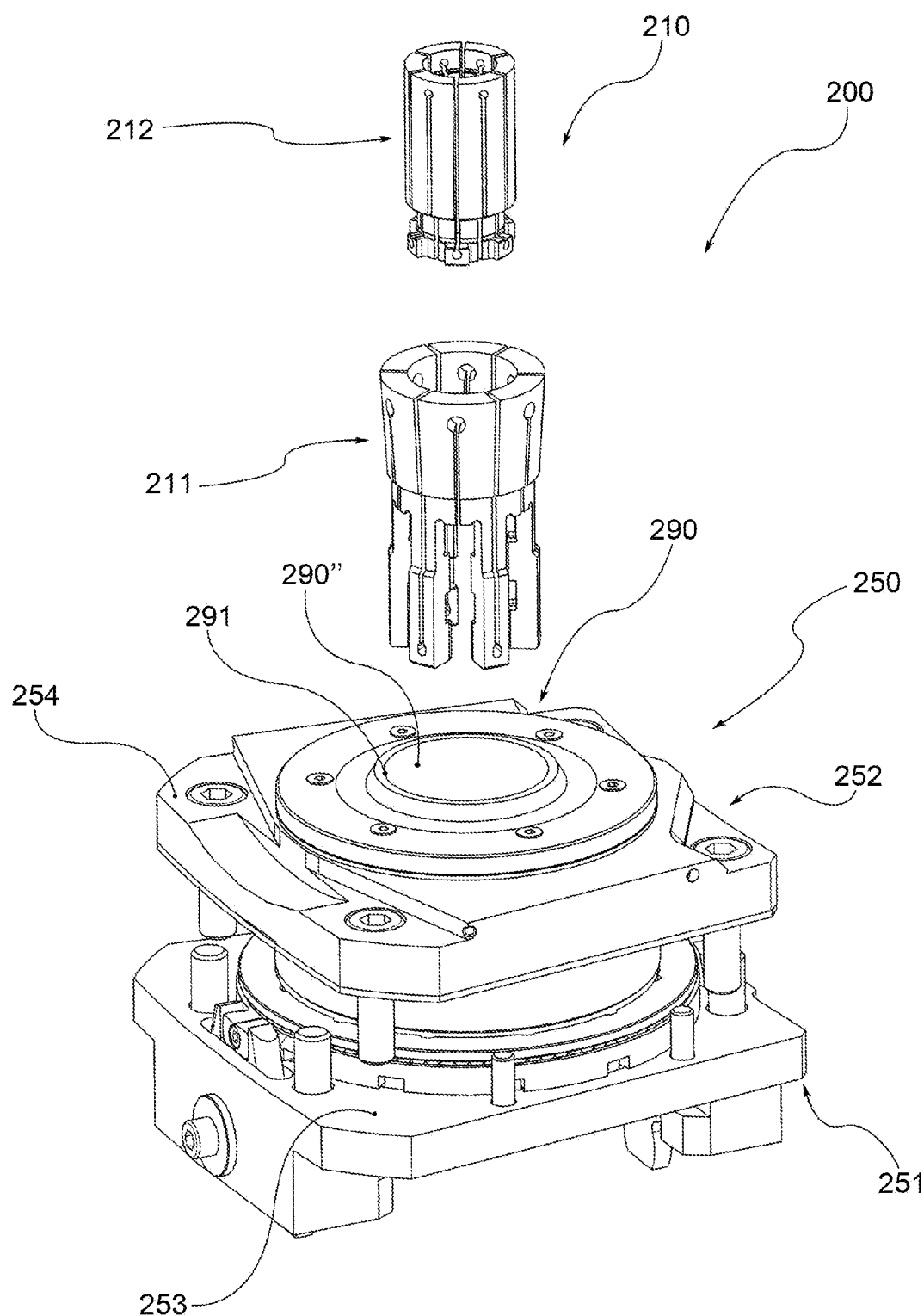
FIG. 2 is a perspective exploded view of the support and gripping device seen from above.
Figure 3:
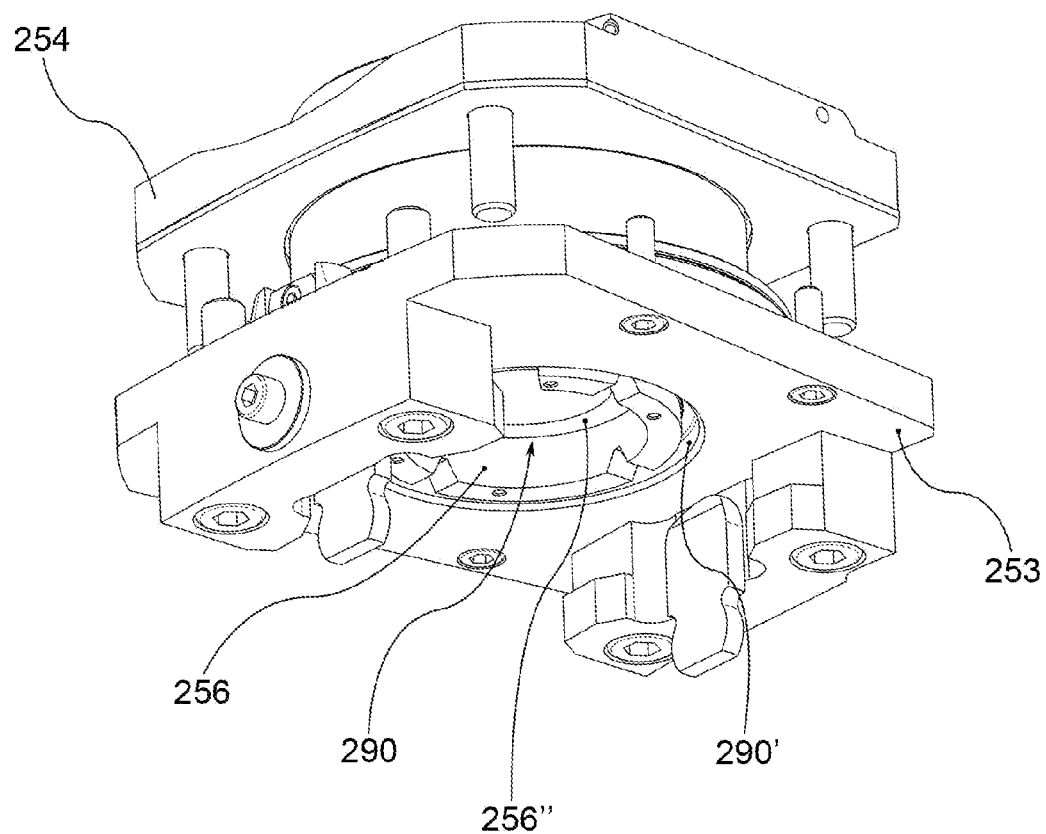
FIG. 3 is a perspective exploded view of the support and gripping device seen from below.
Figure 4:
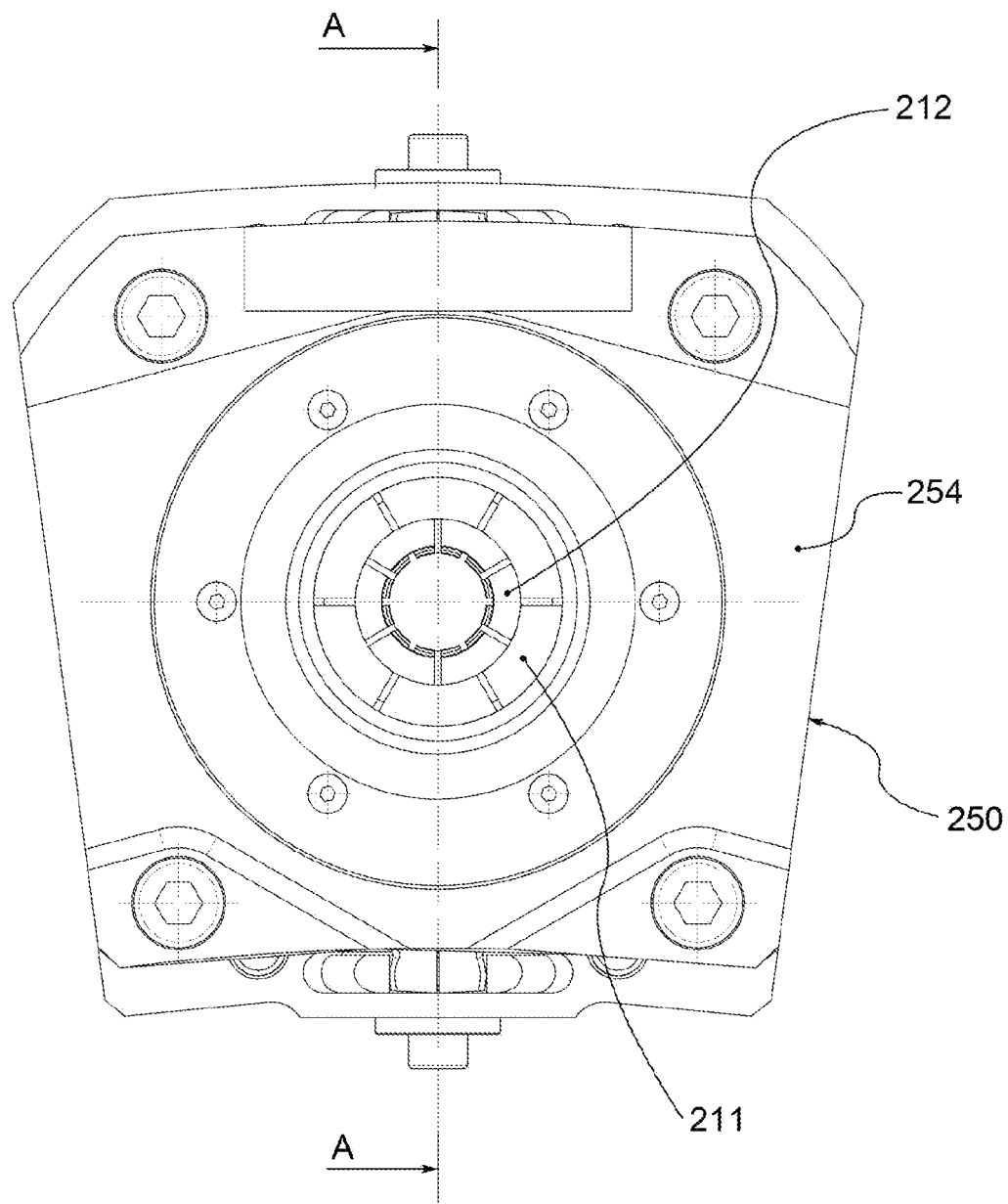
FIG. 4 is a view from above of the support and gripping device.
Figure 5:
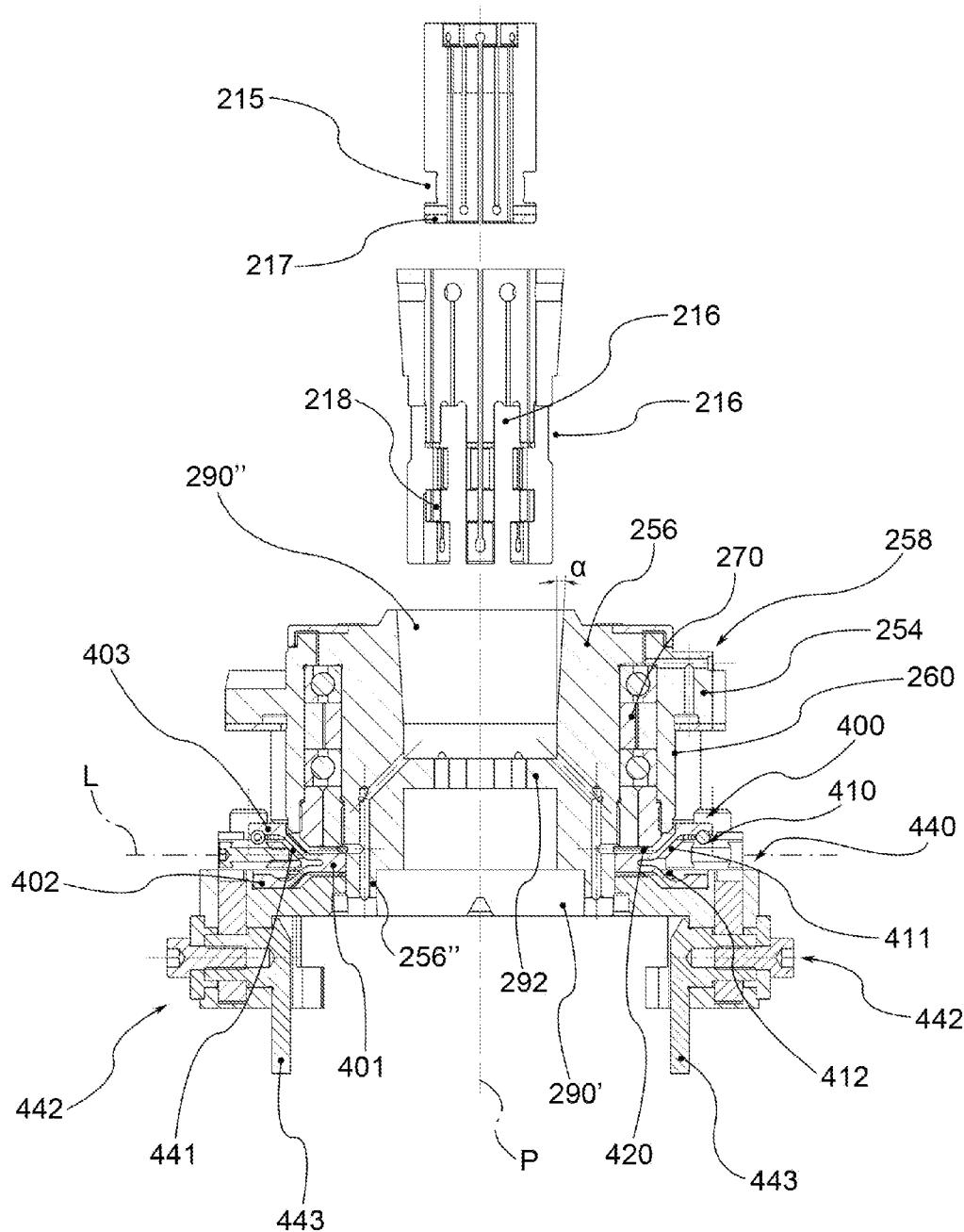
FIG. 5 is an exploded cross-section view of the support and gripping device.
Figure 6:
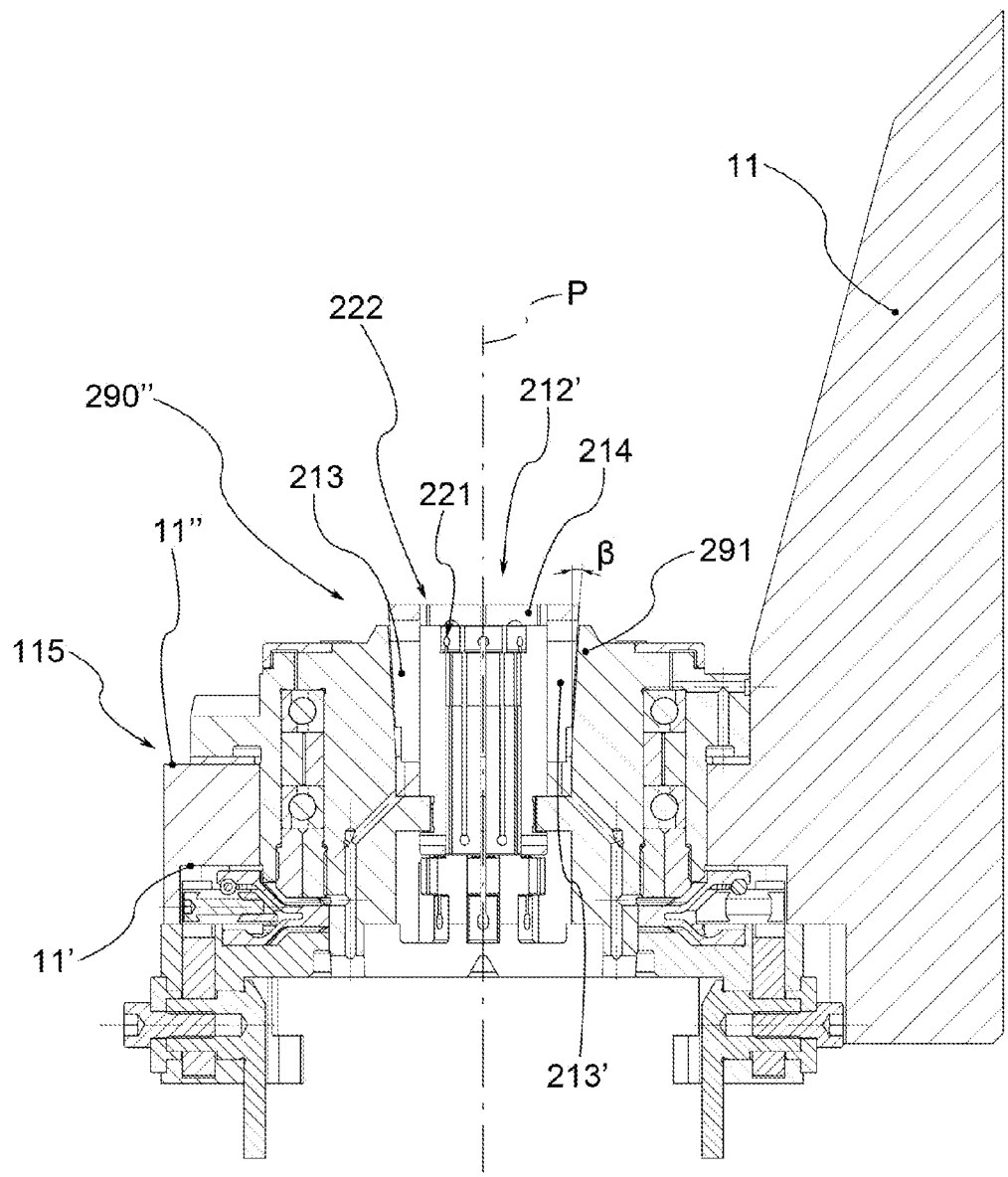
FIG. 6 is a transversal cross-section of the support and gripping device, fitted on a mobile table of a machine tool, wherein the pincer means are in the open position.
Figure 7:
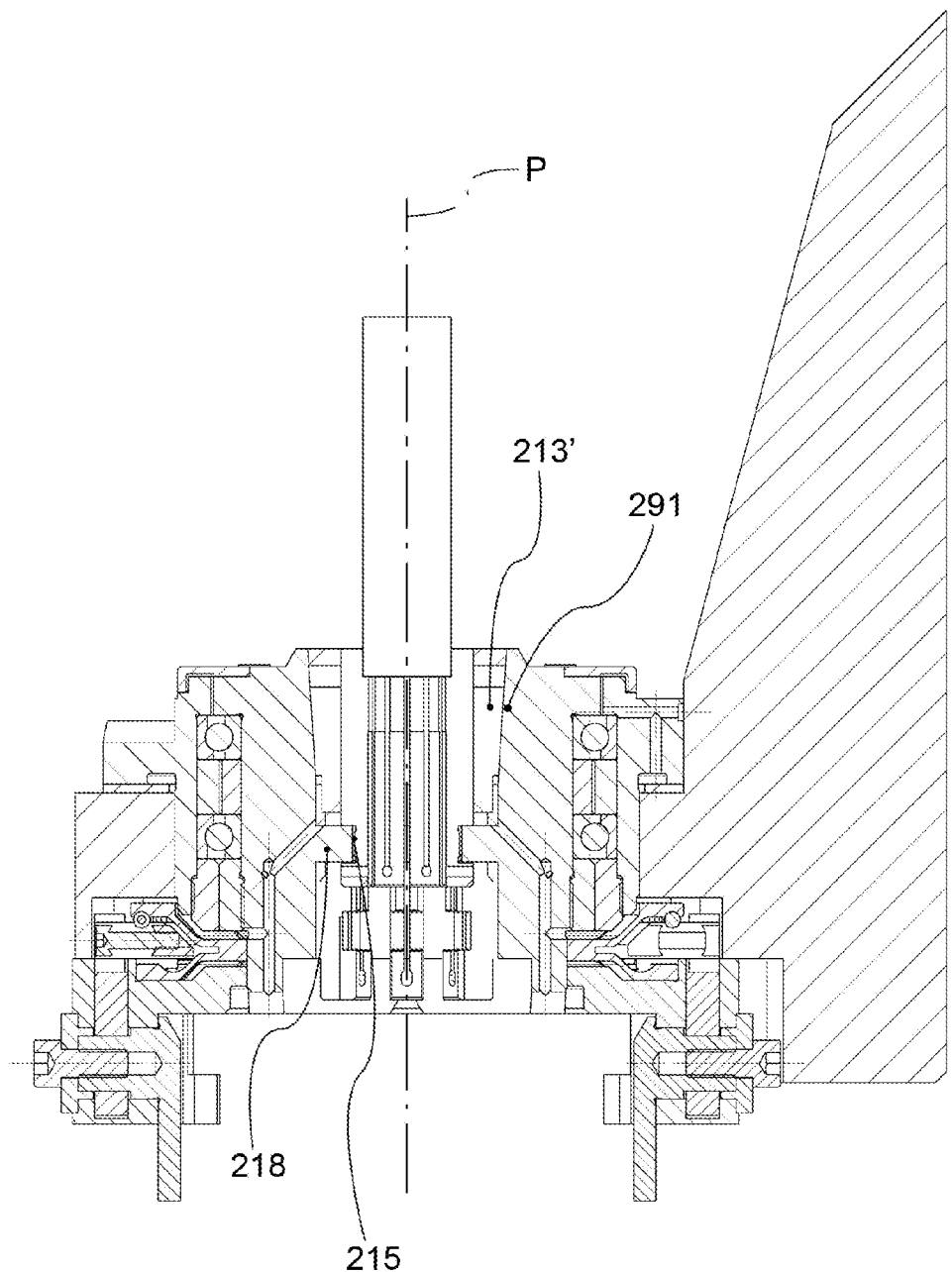
FIG. 7 is a transversal cross-section of the support and gripping device, fitted on a mobile table of a machine tool, wherein the pincer means are in a blocked position, thereby blocking a mechanical part.
Figure 8:
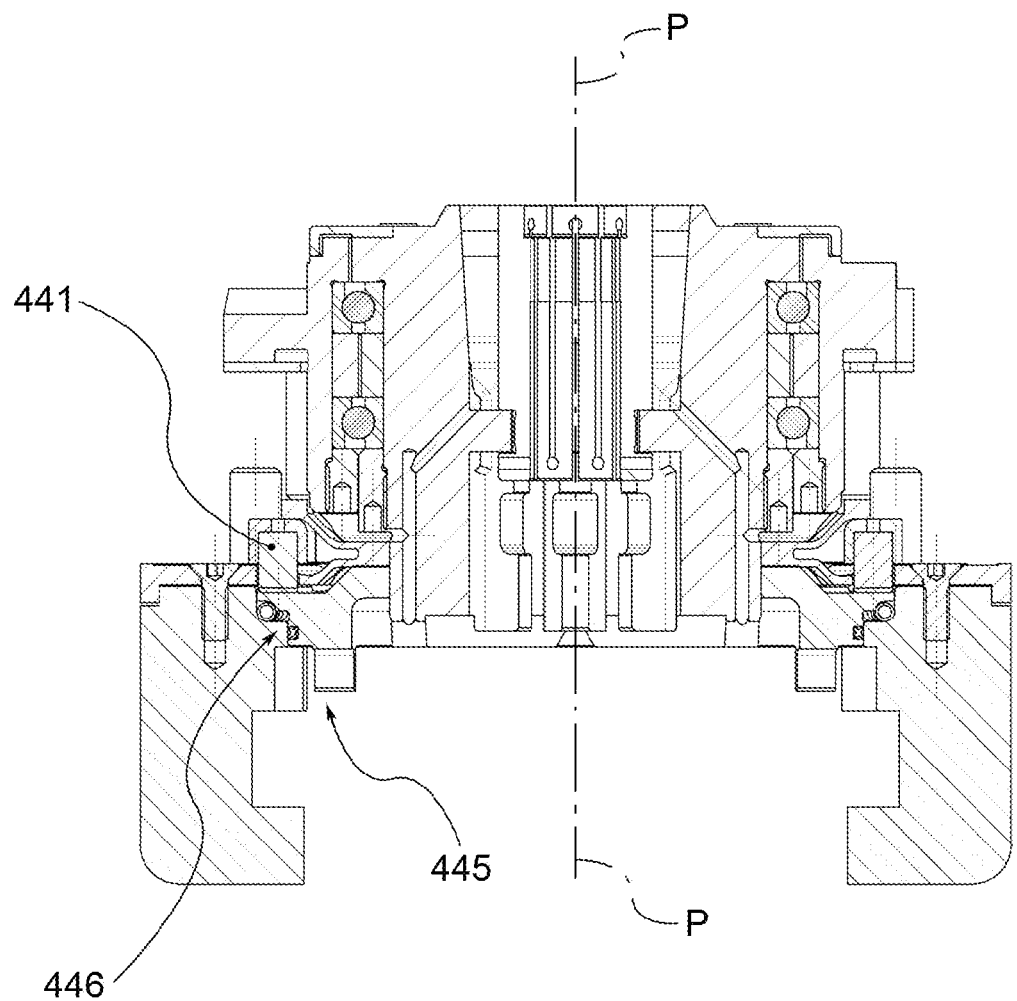
FIG. 8 is a transversal cross-section of the support and gripping device, in an embodiment variation.

With reference to the appended drawings, reference numeral 1 globally denotes the apparatus for mechanical operations which the invention related to.

The apparatus for mechanical operations 1 comprises a machine tool 2, suitable for performing mechanical operations such as mechanical machining for example to remove shavings, or moving operations, or assembly of one or more parts, preferably in a dedicated work area.

The machine tool 2 is suitable for performing one or more operations consecutively; in particular, the machine tool 2 has one or more machining stations wherein to perform the aforesaid operations; for example, the machine tool 2 has several consecutive machining stations wherein to perform several operations consecutively.

For example, the machine tool 2 is suitable for moving one or more finished or semi-finished mechanical parts, components, so as to perform one or more mechanical machining, moving or assembly operations. Each operation can be conducted concurrently with another in a specific machining station.

Preferably the apparatus comprises a protection element and/or cover 3.

Said cover 3 is suitable for covering the machine tool 2 and in particular the work area; this way easy access to the machine tool 2 from the outside is prevented, as is the possibility that the moving parts might accidentally hit an operator in the vicinity causing safety issues; at the same time said moving parts are in turn protected from impact or shifting, superseding the operations.

In addition, the cover 3 is suitable for covering the machine for example to protect it from dust; at the same time the cover 3 is suitable for preventing shavings from coming out into the work area.

In a preferred embodiment the cover 3 is positioned laterally to the machine tool 2.

In a further embodiment, the cover 3 comprises one or more elements positioned along the top in such a way as to provide cover and shelter to the machine tool 2 also from above.

The cover 3 further comprises one or more sliding portions, so as to permit simple ergonomic access by the operator, to the various work stations in which the mechanical operations are performed by the machine tool 2. Specifically, the sliding portions are moved by special means of moving 5.

In a preferred embodiment said movement is of a translatory type, in that said elements translate, or slide, preferably in a direction, for example vertical, so as to leave one or more accesses for the operator to the work stations; this way operations such as maintenance rather than changing one or more tools do not require the operator to access the machine, for example by opening a panel or door.

In a preferred embodiment the apparatus for mechanical operations 1 also comprises a base 4, suitable for supporting the machine 2 and the cover 3.

Said base 4 is further suitable for keeping the machine tool 2 raised in relation to the ground, for example at a given height from the ground, situating itself between the support surface provided by the ground and the machine itself 2.

The machine tool 2 is suitable for performing mechanical operations; in particular, the machine tool 2 comprises means suitable for supporting and moving the mechanical parts to be machined and means suitable for performing the desired mechanical operations. In a preferred embodiment the machine tool 2 comprises a main body 10 suitable for such purposes.

Specifically, in a preferred embodiment the main body 10 extends along a main axis X-X, substantially vertically.

As well as the main body 10, the machine tool 2 further comprises support and gripping devices 200 and operational groups 300, suitable respectively for supporting mechanical parts to perform operations on, and for performing such operations.

The machining stations are therefore identifiable in a circular manner around the main body 10. Preferably, the support and gripping devices 200 and the operational groups 300 are positioned radially in relation to the main body 10, substantially radially in relation to the main axis X-X.

The main body 10, among the other elements, comprises at least one mobile table 11 suitable for supporting and moving the mechanical parts from one machining station to another.

For example, the support and gripping devices 200 are suitable for being positioned in special mechanical part support areas 115 comprised in said mobile tables 11.

In other words the mobile tables 11 and therefore the various mechanical part support areas 115 and subsequently the various support and gripping devices 200 are suitable for being moved, for example, by specific means of moving, usually suitable for placing the aforesaid components in rotation, so as to be shifted from one machining station to another.

In a preferred embodiment the mechanical part support areas 115 are cavities made in the mobile table 11.

In an embodiment variation, said cavities are angularly equidistanced from each other. Preferably, twenty-four mechanical part support areas 115 are made in the mobile table 11, that is, twenty-four cavities.

In a preferred embodiment the mobile table 11 comprises a lower surface 11' which faces the support surface of the machine tool 2, and an upper surface 11" opposite said lower surface 11'.

In a preferred .embodiment said surfaces are parallel to each other.

In a further embodiment variation said surfaces are parallel to the support surface.

In a preferred embodiment, the mobile table 11 is, substantially, the shape of a ring concentric to the main axis X-X.

The support and gripping device 200 is suitable for blocking one or more mechanical parts.

In a preferred embodiment the support and gripping device 200 extends substantially around a pincer axis P-P. In addition, said pincer axis P-P is positioned substantially transversally, preferably perpendicular to the mobile table 11; or again, in relation to the lower 11' and upper surfaces 11" of the mobile table 11.

In a preferred embodiment the support and gripping device 200 comprises a support 250 and pincer means 210.

The pincer means 210 are suitable for blocking the mechanical part or parts.

The support 250 is suitable to contain and support the pincer means 210 and to be blocked to the mobile table 11.

In particular, in the embodiment wherein the mechanical part support areas 115 are through cavities made on the mobile table 11, the support and gripping device 200 is suitable for inserting itself in said cavities and for being blocked to the mobile table 11.

In particular, the support 250 has at least one part of smaller dimensions to that of the cavity 115 and at least one part of larger dimensions in such a way as to co-operate with the mobile table 11.

Specifically, the support 250 comprises a lower portion 251 and an upper portion 252, suitable for reciprocally co-operating, for example having the possibility of interacting with each other.

In a preferred embodiment the lower portion 251 and the upper portion 252 are suitable for co-operating with each other in such a way as to close, thus blocking the support and gripping device 200, sandwiching it on the mobile table 11.

The lower portion 251 is suitable for co-operating with the lower surface 11' of the mobile table 11, and, similarly, the upper portion 252 is suitable for co-operating with the upper surface 11".

In other words the lower portion 251 comprises at least one flange 253 suitable for co-operating with the lower surface 11'; blocking means, such as screws or the like, are suitable for passing through said flange 253, for example through suitable holes, for the purpose of blocking the lower portion 251 to the lower surface 11'.

Similarly the upper portion 252 also comprises at least one flange 254 suitable for co-operating with the upper surface 11"; and again, blocking means such as screws or the like, are suitable for passing, for example through suitable holes, through said flange 254, for the purpose of blocking the upper portion 252 to the upper surface 11".

In a preferred embodiment, the support 250 has inside it, around the pincer axis P-P, a through cavity 290.

Said through cavity 290 is suitable, in a preferred embodiment for housing the pincer means 210.

Said through cavity 290 traverses the entire support 250; said through cavity 290 therefore traverses both the lower portion 251 and the upper portion 252. With reference to the appended drawings, the through cavity 290 in the lower portion 251, hereinafter lower cavity, and the through cavity 290 in the upper portion 252, hereinafter upper cavity are respectively indicated by reference numerals 290' and 290".

In a preferred embodiment, the lower cavity 290' is suitable for housing inside it also a part of the upper portion 252.

In fact, the upper portion 252, centrally, around the upper cavity 290" extends along the pincer axis P-P.

In particular, the upper portion 252 extends for example by a length equal to the thickness of the mobile table 11 so as to co-operate with the lower portion 251 and in particular insert itself in the lower cavity 290'.

In an embodiment variation, the support 250 and in particular the upper portion 252 comprises a central element 256 and a flanged element 258.

Preferably, the central element 256 constitutes the central part of the support 250, preferably of the upper portion 252.

The central element 256 has several of the characteristics mentioned above: for example, among others the fact of delimiting the through cavity 290, and in particular the upper cavity 290", specifically, delimiting the perimeter thereof with it presence, and the fact of extending along the pincer axis P-P as far as inserting itself in the lower cavity 290' present on the lower portion 251.

In particular, the central element 256 comprises a lower end 256", that is, the end suitable for inserting itself in the lower cavity 290'.

The flanged element 258 is external to the central element 256, extending in turn around the pincer axis P-P and the central element 256 itself.

In particular, the flanged element 258 has an outer surface 260 having dimensions maximum equal to the cavity 115; from said surface 260 the flange 254 extends.

The upper portion 252 in turn resting and blocked to the upper surface 11' is therefore housed in the cavity 115.

In a preferred embodiment the central element 256 and the flanged element 258 are distanced from each other.

However, in said space between the central element 256 and the flanged element 258, rotation means 270 such as bearings or bushes or the like suitable for placing the central element 256 in movement in relation to the flanged element 258, are placed.

Specifically, thanks to the means of rotation 270 the central element 256 is suitable for rotating around the pincer axis P-P, centrally in relation to the flanged element 258 which is, instead, blocked to the mobile table 11.

In a preferred embodiment the through cavity 290 has a substantially circular shape around the pincer axis P-P; preferably the lower cavity 290' and the upper cavity 290" are also a circular shape.

In particular, the central element 256 has a substantially axial symmetric shape, inside it is the upper cavity 290" and outside it the means of rotation 270 are located.

In a preferred embodiment the pincer means 210 are suitable for being placed in rotation by means of a mandrel body 600.

In particular, the moving parts of the upper portion 252 of the support 250 are placed in rotation for example by means of a mandrel body 600.

In other words in some machining stations, for example at the bottom, the presence is envisaged of a mandrel body 600 which is suitable for co-operating preferably with the support 250, for example with the bottom of the upper portion 252 so as to place in rotation the central element 256 and thereby place the pincer means 210 in rotation. In particular, said mandrel body 600 is suitable for blocking itself at the lower end 256", so as to transmit the rotatory movement to the central body 256.

In a preferred embodiment, the support 250 also comprises means for braking and blocking the rotation of the pincer means 210.

In particular, said means for braking and blocking the rotation are suitable for braking or inhibiting the rotation of the aforesaid moving parts.

Specifically, said means for braking and blocking the rotation are suitable for acting on the central element 256, preferably on its lower end 256" and in particular radially thereto.

In a preferred embodiment, said means for braking and blocking the rotation comprise at least one membrane 400 and at least membrane means 440.

In a preferred embodiment said membrane 400 is situated on the top of the lower portion 251; while it is closed at the top by the upper portion 252 and/or by the lower surface 11'.

In particular, said membrane 400 is suitable for pressing on the upper portion 252, in a preferred embodiment on the central element 256 to brake and block the rotation thereof.

Preferably, said membrane means 440 are suitable to act on the membrane 400 so as to control its movement.

Specifically, the membrane is moved into a braking position or a rest position by means of the membrane means 440.

In the braking position the membrane 400 is suitable for braking or blocking or preventing the rotation of the pincer means 210, in particular, the membrane is placed in contact with a portion of the support 250 suitable for rotating, thanks to the means of rotation 270, for example with the central element 256, preferably with its lower end 256", in such a way as to brake or block or prevent the rotation thereof.

In the rest position the membrane 400 does not influence the rotation of the pincer means 210 in any way.

From the braking position in which the membrane 400 is in contact with one or more moving parts of the support 250, for example, with the central element which is therefore free to rotate, the membrane 400 is moved as far as the rest position in which no part thereof brakes, blocks or prevents rotation.

In a preferred embodiment said membrane extends annularly around the pincer axis P-P; preferably said membrane 400 is axial symmetric to the pincer axis P-P.

In a preferred embodiment the membrane 400 is a ring shape.

In a preferred embodiment the membrane 400 narrows radially moving towards the pincer axis P-P in a radial direction; preferably it therefore has a substantially triangular or trapezoidal cross-section.

The membrane 400 comprises three ends: a contact end 401 and control ends 402 and 403.

Said control ends 402 and 403 are for example two branches which extend radially outwards in relation to the pincer axis P-P starting from the contact end 401.

The contact end 401 is suitable for performing braking by friction.

In a preferred embodiment in fact, the contact end 401 is suitable for being moved from a braking position, in other words a position in which it is in contact with the central element 256, preferably with its lower end 256", to a rest position in which there is no friction and therefore there is no braking. The friction between the contact end 401 with the central element 256 causes the braking, blocking or prevents the rotation of the said central element 256.

Preferably the control ends 402 and 403 are also annular in relation to the pincer axis P-P. In other words the two control ends 402 and 403 are positioned externally, radially in relation to the contact end 401, preferably one opposite the other, and are suitable for being moved by the membrane means 440.

In particular, a control portion 410 of the membrane 400 is identified between the control ends 402 and 403.

Said control portion 410 of the membrane 400 is an annular recess; preferably the control portion 410 has a substantially triangular or trapezoidal or U-shaped cross-section.

In other words having identified a through plane from the control ends 402 and 403 the control portion 410 is a radial recess which narrows radially towards the centre of rotation of the membrane 400 which corresponds to the pincer axis P-P.

In yet other words, considering the control ends 402 and 403 as two branches which extend from the contact end 401, the control portion 410 is the space comprised between said control ends 402 and 403.

The control portion 410 is therefore delimited by two contact planes: the lower contact plane 411 and the upper contact plane 412, incident to each other.

Preferably the lower contact plane 411 and the upper contact plane 412 are two surfaces facing each other identified by the control ends 402 and 403.

In a preferred embodiment the membrane 400 is formed in a single piece.

In a preferred embodiment the membrane 400 is in metal.

In a preferred embodiment the membrane 400 has a yielding elastic behaviour.

In a preferred embodiment the membrane 400 has radial splits 420 suitable for favouring said yielding elastic behaviour. In particular, said splits 420 extend, for a section, radially from the centre, from the pincer axis P-P, towards the outside of the membrane 400.

In a preferred embodiment the splits 420 are angularly equidistant so as to maintain a uniform elastic behaviour of the membrane 400 when it is moved.

In fact, in a preferred embodiment the membrane 400 is elastically charged.

In particular, if the membrane 400 is not kept in the braking position, it positions itself in the rest position.

In particular, the membrane means 440 are suitable for moving the membrane 400 elastically charging the control ends 402 and 403, in particular, moving radially acting on the control portion 410 and in particular on the contact planes 411 and 412.

In other words the membrane means 440 are suitable for moving the membrane 400, elastically charging the branches which extend from the contact end 401.

In a preferred embodiment the membrane means 440 comprise a contact means 441 suitable for placing itself in contact with said contact planes 411 and 412, or with said branches.

In a preferred embodiment the contact means 441 also extends substantially radially around the pincer axis P-P.

In a preferred embodiment the contact means 441 is an axial symmetric part.

In the braking position of the membrane 400, the contact means 441 is moved and placed in contact with the membrane 400 moving it, in turn radially moving, in particular radially, the contact end 401.

In the rest position of the membrane 400, the contact means 441 is moved radially externally so as to move away from and not be in contact with the membrane 400 and in particular with the contact end 401.

By moving away radially from the membrane 400 and thereby not acting either on the upper contact plane 412 or on the lower contact plane 411, the contact means 441 allows the control portion 410 to widen, that is allows the control ends 402 and 403 to move away from each other, so that the contact end 401 moves backwards.

In other words by moving away radially from the membrane 400 the contact means 441 allows the branches composing the control ends 402 and 403 to move away from each other and thereby radially drag the contact end 401 outwards.

Or again, by pressing on the contact surfaces 411 and 412 the branches tend to move towards each other and as a result the control ends 402 and 403 move radially, towards the centre of the contact end 401; vice versa by not acting on said contact surfaces 411 and 412 the control ends 402 and 403 tend to move away from each other thereby moving the contact end 401 radially outwards.

In a preferred embodiment the membrane means 440 comprise a leverage device 442 suitable for moving the contact means 441.

In a preferred embodiment said leverage device 442 makes it possible to move the contact means 441 radially, so as to permit the movement of the membrane 400 between the braking position and the rest position, thereby discharging the forces involved caused by the membrane 400, on itself and not on the support device 250 or even on the mobile table 11.

In particular, the leverage device 442 comprises two tongues 443 suitable for being moved. Preferably, the tongues 443 are suitable for being moved radially around a longitudinal axis L-L.

Said tongues 443, when moved, are suitable for moving in turn the contact means 441, for example by some cam means, so as to make it assume the desired positions.

As a result a radial movement around the longitudinal axis L-L of the tongues 443 corresponds to a radial movement inwards of the contact means 441 and thereby the passage from the braking position to the rest position of the membrane 400.

In a further embodiment, said tongues 443 are positioned below the support 250 in the cavity 290, preferably below the lower portion 251, preferably inside the lower cavity 290'.

In a preferred embodiment the tongues 443 are suitable for being moved as described by the mandrel group 600, which in a preferred embodiment, co-operates with the support and gripping device 200 axially upwards.

In a further embodiment, rather, the contact means 441 is moved in an axial direction, that is to say parallel to the pincer axis P-P, so as not to be in contact with the membrane 400 and in particular with neither of the control ends 402 and 403.

In particular, the contact means 441 moves away axially from one of the contact ends 402 and 403 thereby not acting either on the upper contact plane 412 or on the lower contact plane 411thereby permitting the command portion 410 to widen these, that is permitting the control ends 402 and 403 to move away from each other, so that the contact end 401 moves backwards.

In other words by moving away axially from the membrane 400 the contact means 441 allows the branches composing the control ends 402 and 403 to move away from each other and thereby radially drag the contact end 401 outwards.

In a preferred embodiment the membrane means 440 comprise a cam device 445 suitable for moving the contact means 441.

In a preferred embodiment said cam device 445 makes it possible to move the contact means 441 axially, so as to permit the movement of the membrane 400 between the braking position and the rest position, thereby discharging the forces involved caused by the membrane 400, on itself and not on the support device 250 or even on the mobile table 11. Consequently discharging the forces involved caused by the membrane 400 axially and not radially.

In particular, the cam device 445 is suitable for being rotated.

In particular, said cam device 445 extends around the pincer axis P-P.

Preferably, the cam device 445 is axial symmetric.

In addition, the cam device 445 comprises portions of different heights, suitable therefore to move axially, pushing the contact means 441 in such direction.

Preferably, the cam device 445 comprises in fact high portions, that is to say, of greater thickness, and low portions, that is to say of lesser thickness.

In a preferred embodiment a rotation of the cam device 445 around the pincer axis P-P corresponds with a change in position of the various high and low portions which, as a result, end up changing position, as a result, this way, the axial position of the contact means 441 or a portion thereof also varies parallel to the pincer axis.

For example, in a preferred embodiment the contact means 441 also comprises portions in turn of different dimensions suitable for co-operating with the high and low portions comprised in the cam device 445. Said co-operation thereby permits the axial translation of the contact means 441.

That is to say that the contact means 441 following rotation of the cam device 445 raises or lowers itself thereby moving away from the membrane 400 and consequently permitting the latter to move from a braking position to a rest position.

In a further embodiment, the cam device 445 is positioned below the support 250 in the cavity 290, preferably below the lower portion 251, preferably inside the lower cavity 290'.

In a preferred embodiment the cam device 445 is suitable for being moved as already described by the mandrel group 600, which in a preferred embodiment, co-operates with the support device 200 in such a way as to rotate it.

In a preferred embodiment the pincer means 210 are situated in the through cavity 290.

Preferably, the pincer means are located in the upper cavity 290".

The pincer means 210 are suitable to block a mechanical part, co-operating with the support 250, specifically with the upper portion 252.

Preferably, the pincer means 210 also extend around the pincer axis P-P.

In a preferred embodiment the pincer means 210 are axial symmetric.

Preferably, the pincer means 210 comprise a part blocking pincer 212 and an intermediate pincer 211.

In particular, the part blocking pincer 212 is suitable for acting directly on the mechanical part. Preferably, the part blocking pincer 212 is fixed axially while only the intermediate pincer 211 is moved.

While the intermediate pincer 211 is suitable for co-operating with the part blocking pincer 212 and with the support 250.

In particular, the intermediate pincer 211 is positioned inside the upper cavity 290", surrounding the part blocking pincer 212.

In fact, both the part blocking pincer 212 and the intermediate pincer 211 are elastically yielding in such a way as to modify their shape.

In particular, the intermediate pincer 211 is suitable for modifying its shape, specifically tightening radially, co-operating with a delimiting surface 291, which laterally delimits the through cavity 290, in other words which laterally delimits the upper cavity 290".

Since the part blocking pincer 212 is placed inside the intermediate pincer 211 the radial tightening of the intermediate pincer 211 causes the part blocking pincer 212 to modify its shape.

In turn, in fact, the part blocking pincer 212 is suitable for yielding annularly and tightening radially remaining, as said, axially immobile.

The part blocking pincer 212 has inside it a housing cavity 212' suitable for containing mechanical parts. A radial tightening of the part blocking pincer 212 therefore corresponds with the blocking of the mechanical part contained.

In a preferred embodiment the intermediate pincer 211 is suitable for co-operating with the delimiting surface 291.

The delimiting surface 291 delimiting the upper cavity 290" extends around the pincer axis P-P.

In a preferred embodiment the delimiting surface 291 comprises an inclined support portion 291' at the top.

In particular, the inclined support portion 291' is inclined in relation to the pincer axis P-P by several degrees, in such a way that at the top the through cavity 290, in particular the upper cavity 290", is wider than it is at the bottom.

Preferably the inclined support portion 291' is inclined in relation to the pincer axis P-P by an angle $\alpha$.

Said angle $\alpha$ is inclined by an angle of 2° to 5°, preferably about 3.5°.

In a preferred embodiment the intermediate pincer 211 has an outer surface 213 suitable for co-operating with the support 250, in particular with said inclined support portion 291'.

In turn, in fact, the outer surface 213 of the intermediate pincer 211 comprises, at the top, an inclined pincer portion 213'.

Preferably the inclined pincer portion 213' is inclined in relation to the pincer axis P-P by an angle $\beta$.

Said angle $\beta$ is inclined by an angle of 2° to 5°, preferably about 3.5°.

The inclined support portion 291' and the inclined pincer portion 213' are therefore suitable for co-operating reciprocally sliding on each other.

The sliding of the two portions thereby causes a radial tightening of the intermediate pincer 211 on the part blocking pincer 212 blocking the mechanical part inside it and blocking the intermediate pincer 211 and the part blocking pincer 212 to each other.

In particular, the mechanical part is axially inserted, along the pincer axis, in the part blocking pincer 212.

According to a preferred embodiment, the housing cavity 212' is wider at the top so as to present a suitable mechanical part housing area 214 in which the mechanical part is positioned.

The intermediate pincer 211 is suitable for being moved axially along the pincer axis P-P.

Preferably, the intermediate pincer 211 is suitable for being axially pulled along the pincer axis P-P.

Once the mechanical part has been inserted in the housing cavity 212' preferably in the housing area 214 in the part blocking pincer 212, the intermediate pincer 211 is moved axially, preferably pulled downwards, this way the inclined pincer portion 213' begins to slide on the inclined support portion 291' thereby causing a tightening of the intermediate pincer 211 on the part blocking pincer 212 thereby blocking the mechanical part.

By means of this method of support and gripping one or more mechanical parts are blocked by the pincer means 210.

In a preferred embodiment the interaction between the two inclined portions is of the Morse taper type.

The interaction between the two inclined portions is therefore irreversible; and is maintained over time in such a way that the part cannot detach itself, except on command by the support and gripping device 200.

In a preferred embodiment the part blocking pincer 212 is composed of a single piece.

In particular, the part blocking pincer 211 is in metal.

Preferably, the part blocking pincer 212 has elastically yielding behaviour thanks to the presence of suitable mechanical part blocking notches 222 in the thickness of the part blocking pincer 212.

Said mechanical part blocking notches 222 are preferably parallel to the pincer axis P-P, reciprocally separated in an equidistanced angular manner so that the pincer has a uniform behaviour when it undergoes radial or axial actions.

Preferably, the mechanical part blocking notches 222 alternate, extending, for a section, upwards and downwards in relation to the pincer axis P-P.

Similarly, the part blocking pincer 212, also the intermediate pincer 211 is composed of a single piece, preferably of metal.

In addition, the part blocking pincer 212 has an elastically yielding behaviour thanks to the presence of suitable intermediate notches 221 in the. thickness of the intermediate pincer 211; said intermediate notches 221 are preferably parallel to the pincer axis P-P, reciprocally separated in an equidistanced angular manner so that the pincer has a uniform behaviour when it undergoes radial or axial actions.

Preferably, also in the intermediate pincer 211, preferably, the intermediate notches 221 alternate extending, for a section, from upwards and to downwards and from downwards to upwards in relation to the pincer axis P-P.

In a preferred embodiment the intermediate pincer 211 is blocked to the support 250 by a bayonet attachment.

Preferably, the part blocking pincer 212 is also axially blocked to the support 250 by a bayonet attachment.

Preferably, the part blocking pincer 212 is axially blocked to the intermediate pincer 211 by a bayonet attachment.

For such purpose at least one projecting element 292 is provided on the delimiting surface 291, which projects towards the centre of the cavity 290, towards the pincer axis P-P.

Said projecting element 292 is suitable for co-operating with suitable intermediate annular recesses 216 present laterally on the intermediate pincer 211.

In addition, said projecting element 292 is suitable for co-operating with suitable part blocking annular recesses 215 present laterally on the part blocking pincer 212.

In addition, the part blocking pincer 212 has at least one tooth 217 suitable for inserting itself in at least one hollow 218 present internally on the intermediate pincer 211.

In a preferred embodiment the movement along the pincer axis P-P of the intermediate pincer 211 is caused by the mandrel group 600.

Said mandrel group is in fact suitable for co-operating with the intermediate pincer 211, preferably with the bottom thereof, so as to move it axially, The mandrel group 600 is therefore suitable for pulling the intermediate pincer downwards along the pincer axis P-P.

The release of the pincer means 210, once blocked by the interaction of the inclined portions, is performed by means of an axial action in the direction of the pincer axis P-P opposite to the axial action which caused the closure of the pincer means 210.

In the embodiment shown as a result, the axial release action of the pincer means 210 is upward.

Preferably, said release action is performed on the bottom of the intermediate pincer 211.

In a preferred embodiment said thrust is provided by the mandrel group 600.

Innovatively, the support and gripping device and the machine tool which the invention relates to permit the gripping and the support of the mechanical part so as to leave at least five sides of an imaginary cube surrounding it free.

Advantageously, the support and gripping device is suitable for rotating the mechanical parts inasmuch as connectable to a mandrel group; specifically it is able to place the mechanical part in rotation at a speed of close to 6000 revs/min.

Advantageously, the gripping is performed with pincer means suitable for reciprocally co-operating with the support in such a way that following an axial pressure these cause a radial pressure so as to reciprocally block with the mechanical part.

Advantageously, release is possible by acting on the pincer means in a direction opposite to the axial force which the blocking was performed with.

Advantageously, both the blocking and release are not produced for example by pneumatic or hydraulic means but by interaction of the various components; advantageously, by carefully calibrating the inclined portions of the surfaces, Morse taper type; and the elasticity of the mechanical parts, the blocking is irreversible and can only be released by means of a release such as that described above.

Advantageously, the variables regarding the "life" of the device are of a purely mechanical nature.

Advantageously, the interactions with the mechanical parts, to block and release them are very rapid. Said devices can therefore be fitted to apparatus and machine tools requiring very fast timing, such as a machine tool where there is little space between one work station and another and little mechanical part changeover time.

Advantageously, the blocking surface is minimised and can be minimised to the utmost, maintaining very high gripping accuracy values.

Advantageously, the calibration of said interaction between the elements makes for very firm blocking achieving thereby very high accuracy values.

Advantageously, the part blocking pincer is fixed axially while only the intermediate pincer is moved. As a result the axial position of the mechanical part once inserted in the part blocking pincer remains constant.

Advantageously, all the pincer means are in metal and therefore very solid.

In a preferred embodiment the part blocking pincer is heat treated so as to be superficially, where the mechanical part is blocked and housed, softer, so as not to be locally over fragile, running the risk of local fractures, and so as not to spoil the mechanical part during the blocking phase.

Advantageously, the pincer means are connected to each other by means of a bayonet system which therefore envisages a very rapid attachment-release thereof. In this case changing the part blocking pincer is very rapid and consequently this can be rapidly replaced depending on the dimensions of the mechanical part to be blocked.

Advantageously the rotation can be minimised, blocked or prevented by means of the membrane which is able to produce a torque of 15 Nm.

Advantageously, the system of leverages for the positioning of the membrane in a rest or braking position makes it possible to prevent the discharge of forces in an axial direction on the mobile table which the device is mounted on.

Advantageously, the intermediate pincer is moved downwards and upwards by a mandrel group.

Advantageously, the mandrel group also moves the membrane by means of the membrane means.

A person skilled in the art may make variations to the embodiments of the aforesaid device, replacing elements with others functionally equivalent so as to satisfy specific requirements.

In a further embodiment variation the support is composed differently from that illustrated, for example the central element may be envisaged on the lower portion.

Or again, in a further embodiment variation the mechanical part is supported and gripped from below and not from above; such a solution envisages the inversion of various components described above as upper, lower and vice versa.

In further embodiment variations the rotation of the pincer means is performed directly on these and not on the upper portion, in particular on the central element.

In further embodiments suitable servo systems of oils, liquids or fluids, such as air, for the lubrication of the mechanical parts are envisaged inside some components of the device.

In further embodiments systems for pressurising or depressurising areas between said components are envisaged inside some components of the device.

Such variations are also contained within the sphere of protection as defined by the following claims.

In addition, each variation described as belonging to a possible embodiment may be realised independently of the other variations.

The invention claimed is:

1. A support and gripping device of a mechanical part, extending around a pincer axis, suitable for being fitted to a machine tool for mechanical operations comprising a mandrel group and a mobile table, wherein the support and gripping device comprises:
 a pincer suitable to block said mechanical part;
 a support suitable to contain and support said pincer and suitable to be attached to a mobile table;
  wherein both the pincer and the support extend around said pincer axis, wherein the support has inside it, around the pincer axis, a through cavity, in said through cavity the pincer is located, wherein the pincer comprises a part blocking pincer and an intermediate pincer, the first axially fixed, respectively one inside the other, both with elastic characteristics, wherein said part blocking pincer has an elastically yielding annular structure suitable for gripping the mechanical part following interaction between the intermediate pincer and the support, wherein said interaction between the intermediate pincer and part blocking pincer is irreversible and is maintained over time in such a way that the part cannot detach itself, except on command by the support and gripping device;
  wherein the intermediate pincer is moved downwards and upwards by a mandrel group, in order to obtain said interaction between the intermediate pincer and the support and detachment of the support;
  wherein the pincer is suitable to be placed in rotation around said pincer axis by said mandrel group; and
  wherein the part blocking pincer and the intermediate pincer are attached to the support by a bayonet attachment.

2. A support and gripping device of a mechanical part, extending around a pincer axis, suitable for being fitted to a machine tool for mechanical operations comprising a mandrel group and a mobile table, wherein the support and gripping device comprises:
 a pincer suitable to block said mechanical part;
 a support suitable to contain and support said pincer and suitable to be attached to a mobile table;
  wherein both the pincer and the support extend around said pincer axis, wherein the support has inside it, around the pincer axis, a through cavity, in said through cavity the pincer is located, wherein the pincer comprises a part blocking pincer and an intermediate pincer, the first axially fixed, respectively one inside the other, both with elastic characteristics, wherein said part blocking pincer has an elastically yielding annular structure suitable for gripping the mechanical part following interaction between the intermediate pincer and the support, wherein said interaction between the intermediate pincer and part blocking pincer is irreversible and is maintained over time in such a way that the part cannot detach itself, except on command by the support and gripping device;
  wherein the intermediate pincer is moved downwards and upwards by a mandrel group, in order to obtain said interaction between the intermediate pincer and the support and detachment of the support;
  wherein the pincer is suitable to be placed in rotation around said pincer axis by said mandrel group; and
  wherein the support comprises a means of braking and/or blocking the rotation of the pincer.

3. The support and gripping device according to claim 2, wherein the means of braking and/or blocking rotation comprises at least one elastically yielding membrane able to perform said braking and/or said blocking and membrane means suitable to act on said membrane so as to control its movement between a braking position and a rest position, in which said braking does not take place.

4. The support and gripping device according to claim 3, wherein said membrane extends annularly around the pincer axis and has a cross-section which narrows radially as it approaches the pincer axis; for example having a substantially triangular or trapezoidal cross-section.

5. The support and gripping device according to claim 4, wherein the membrane comprises a contact end suitable to perform the braking and/or blocking by friction, and two control ends which extend from said contact end radially outwards from the pincer axis.

6. The support and gripping device according to claim 5, wherein between the control ends the membrane comprises a control portion suitable to be controlled by the membrane means.

7. The support and gripping device according to claim 6, wherein said control portion has the shape of an annular recess, narrowing radially towards the pincer axis, wherein the membrane means are suitable to radially move the contact end elastically charging the membrane, which if not kept in the braking position positions itself in the rest position.

8. The support and gripping device according to claim 3, wherein the membrane is made in a single piece of metal.

9. The support and gripping device according to claim 3, wherein the membrane comprises splits suitable to favor the elastic behavior of the membrane.

10. The support and gripping device according to claim 9, wherein the splits are angularly equidistant from each other and extend radially for a section of membrane from the pincer axis outwards.

* * * * *